United States Patent
Branlund et al.

(10) Patent No.: US 9,509,539 B2
(45) Date of Patent: *Nov. 29, 2016

(54) AAS DIRECT SIGNALING FRAMING METHODOLOGIES TO SUPPORT HIGH CAPACITY WIRELESS LINKS

(71) Applicant: The DIRECTV Group, Inc., El Segundo, CA (US)

(72) Inventors: Dale A. Branlund, Portola Valley, CA (US); Matthew C. Bromberg, Leominister, MA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,971

(22) Filed: Jul. 31, 2015

(65) Prior Publication Data

US 2016/0036610 A1 Feb. 4, 2016

Related U.S. Application Data

(63) Continuation of application No. 14/041,192, filed on Sep. 30, 2013, now Pat. No. 9,100,093, which is a continuation of application No. 13/171,108, filed on Jun. 28, 2011, now Pat. No. 8,547,822, which is a (Continued)

(51) Int. Cl.
| | |
|---|---|
| *H04L 27/26* | (2006.01) |
| *H04W 74/00* | (2009.01) |
| *H04B 7/26* | (2006.01) |
| *H04B 7/06* | (2006.01) |
| *H04L 5/00* | (2006.01) |

(52) U.S. Cl.
CPC ........ *H04L 27/2605* (2013.01); *H04B 7/0678* (2013.01); *H04B 7/2621* (2013.01); *H04L 5/0044* (2013.01); *H04W 74/002* (2013.01)

(58) Field of Classification Search
None
See application file for complete search history.

(56) References Cited

U.S. PATENT DOCUMENTS

| 6,128,276 A | 10/2000 | Agee |
| 6,512,737 B1 | 1/2003 | Agee |

(Continued)

FOREIGN PATENT DOCUMENTS

| WO | WO 98/37638 | 8/1998 |

OTHER PUBLICATIONS

IEEE Standards for Local and Metropolitan Area Networks Part 16: Air Interface for Fixed Broadband Wireless Access Systems, IEEE Std 802,16-2004; Jan. 1, 2004; Chp. 8.4.4 Frame Structure, pp. 499-519.

(Continued)

*Primary Examiner* — Christine Duong
(74) *Attorney, Agent, or Firm* — Pillsbury Winthrop Shaw Pittman LLP (57) ABSTRACT

A new frame structure applicable to the IEEE 802.16 OFDMA wireless waveform is described, for the purposes of increasing base station capacity, increasing subscriber link rates and extending base station range. The frame structure provides the necessary constructs so that advance signal processing technologies such as Stacked Carrier Spread Spectrum and adaptive antenna technology may be used in combination with these constructs in order to realize these gains. These concepts are equally applicable in other advanced wireless waveforms based on OFDM or OFDMA such as LTE or UMB.

20 Claims, 7 Drawing Sheets

Related U.S. Application Data continuation of application No. 11/936,786, filed on Nov. 7, 2007, now Pat. No. 8,009,552.

(60) Provisional application No. 60/864,701, filed on Nov. 7, 2006.

(56) References Cited

U.S. PATENT DOCUMENTS

| | | |
|---|---|---|
| 7,542,439 B2 | 6/2009 | Rubin |
| 7,567,639 B2 | 7/2009 | Huh et al. |
| 7,647,073 B2 | 1/2010 | Sung et al. |
| 7,821,994 B2 | 10/2010 | Sherman et al. |
| 7,826,417 B2 | 11/2010 | Yang et al. |
| 7,872,961 B2 | 1/2011 | Yu et al. |
| 7,885,214 B2 | 2/2011 | Ahmadi et al. |
| 7,974,176 B2 | 7/2011 | Zheng |
| 8,045,447 B2 | 10/2011 | Bitran et al. |
| 2002/0158801 A1 | 10/2002 | Crilly et al. |
| 2003/0123384 A1 | 7/2003 | Agee |
| 2006/0092875 A1 | 5/2006 | Yang et al. |
| 2006/0153227 A1 | 7/2006 | Hwang et al. |
| 2006/0205437 A1 | 9/2006 | Sung et al. |
| 2007/0286127 A1 | 12/2007 | Inohiza |

OTHER PUBLICATIONS

Bromberg, et al., The Use of Programmable DSPs in Antenna Array Processing, Oct. 13, 2005, pp. 1-40.

Air Interference for Fixed Broadband Wireless Access Systems, IEEE Comp. Soc. Microwave Theory and tech Soc., Oct. 2004, Sec. 81., pp. 307-354, Sec. 8.4.4 pp. 499-520, Sec. 8.4.6.3 pp. 574-576.

Air Interference for Fixed Broadband Wireless Access Systems, IEEE Comp. Soc. Microwave Theory and tech Soc., Feb. 2006, Sec. 8.1, pp. 317-318; Sec. 8.4, pp. 353-367.

Van Trees, Optimum Array Processing, 2002, pp. 23-42, 165-173 and 485-488.

AAS DIRECT SIGNALING FRAMING METHODOLOGIES TO SUPPORT HIGH CAPACITY WIRELESS LINKS

This application is a continuation of U.S. patent application Ser. No. 14/041,192 filed Sep. 30, 2013, which is a continuation of U.S. patent application Ser. No. 13/171,108 filed Jun. 28, 2011 (now U.S. Pat. No. 8,547,822), which is a continuation of U.S. patent application Ser. No. 11/936,786, filed on Nov. 7, 2007 (now U.S. Pat. No. 8,009,552), and which claims priority to U.S. Provisional Patent Application No. 60/864,701 filed on Nov. 7, 2006, which applications are expressly incorporated by reference herein in their entirety.

The following disclosure submitted herewith as a U.S. Patent application. Knowledge of the references cited herein, as well as the current proposal for 802.16, is assumed. While this document proposes a new AAS frame/zone to the 802.16 orthogonal frequency-division multiple access (OFDMA) frame structure in order to support high capacity base stations and high capacity mobile relay base stations, it contains teachings that are broader in scope than that specific purpose.

BACKGROUND

The term AAS (adaptive antenna system) refers to an orthogonal frequency-division multiplexing (OFDM) or OFMDA system adaptively exploiting more than one antenna to improve the coverage and the system capacity. Multi-user AAS refers to the ability to support multiple user links simultaneously on the same sub-channel in the same timeslot through the use of AAS techniques coupled with active interference cancellation. Multi-user AAS is also referred to as "multi-beam adaptive beamforming and null-steering". Stacked carrier spread spectrum (SCSS) is a new form of spread spectrum first described in U.S. Pat. No. 6,128,276 that, in combination with code nulling, can communicate with multiple users by adaptive coding redundant data onto separate OFDM subcarriers. Extensions of SCSS include the seamless integration of spatially disperse copies of the same data received on the same subcarriers. When used in this way, the processing is called SCSS adaptive array processing. When code nulling is applied in SCSS, then multiple users can be optimally isolation from each other in "code space" or in "generalized code space" by adding spatial samples to the solution.

SUMMARY OF THE INVENTION

The present invention provides, in one aspect, a new frame structure applicable to the IEEE 802.16 OFDMA wireless waveform, for the purposes of increasing base station capacity, increasing subscriber link rates and extending base station range. The frame structure provides the necessary constructs so that advance signal processing technologies such as Stacked Carrier Spread Spectrum and adaptive antenna technology may be used in combination with these constructs in order to realize these gains.

Other aspects of the invention are also described herein.

DETAILED DESCRIPTION OF THE PREFERRED EMBODIMENTS

Multi-user technology extends cell coverage by improving the system link budget and lowering the interference floor. Link budget gain is realized through the combining of signals received and/or transmitted from multiple antenna elements and/or multiple subcarriers, as well as by increasing the diversity provided by a multi-element antenna array and/or multiple copies of the signal. At the same time, multi-user SCSS adaptive arrays increases base station capacity by enabling the use of higher order modulation and reuse of spectral resources within the same cell. Finally, we define an AAS frame and AAS zone consistent with the definition in the IEEE 802.16 standard. These definitions describe frames or zones where adaptive array processing is enabled. AAS methods include conventional adaptive array processing or SCSS adaptive array processing.

This document thus describes modifications to the 802.16 OFDMA AAS zone structure, adds new AAS training sequences and modifies associated MAP IEs in order to achieve higher spectral efficiency of MMR-base stations in realistic propagation environments and enable the use of multi-user AAS on the MMR-BS-RS link. Moreover, modifications are described to increase capacity on the bandwidth request signaling channel so that bandwidth requests and grant allocations scale linearly with higher capacity.

Various aspects of the present invention are described, in a manner that is intended to facilitate understanding of the various different inventions herein. Aspects of these various inventions can also be combined, as will be apparent.

Framing to Support AAS and SCSS

Overall Frame Structure

Figure 1:
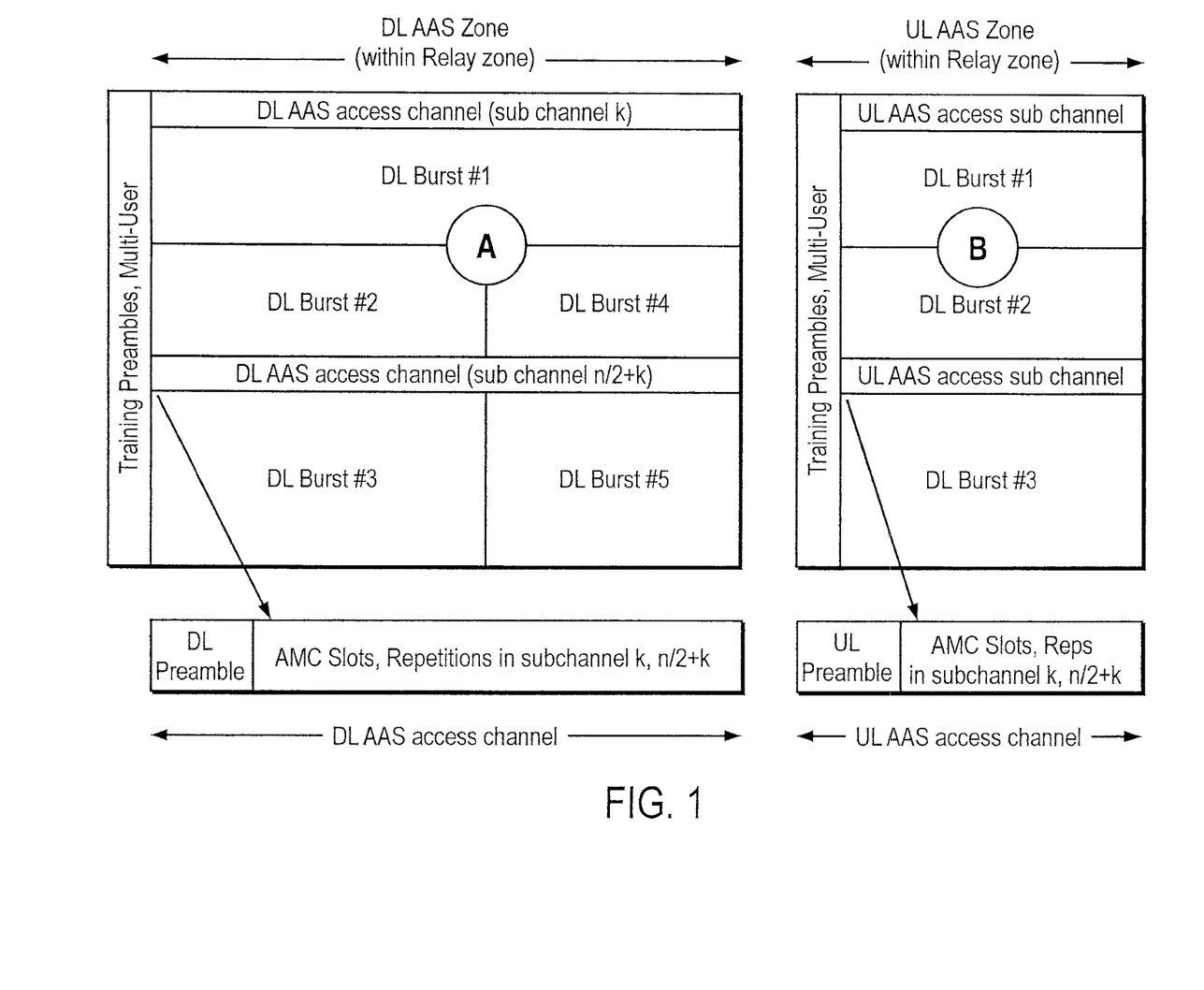
FIG. 1 illustrates the composition of the AAS frame.

FIG. 1 illustrates the composition the AAS frame (called AAS Direct Signaling frame) with zone "A" indicating the DL subframe and zone "B" indicating the UL subframe. FIG. 1 shows the access subchannel k paired with subchannel k+n/2 where n is the total number of subchannels and k is the number of subchannels designated for access. The access channel is used for bandwidth request, bandwidth grant, ranging, and registration. Unlike the IEEE 802.16 standard, the channel in the subcarrier dimension is "thin" so that power concentration from distant subscribers is possible thus increasing range. Moreover, the thin frequency support enables precision code nulling and spatial nulling technologies for improved reception and multi-user array processing.

Two OFDMA symbols containing the AAS training preambles are used in the frame structure to demarcate the zone [nominally transmitted in symbols 4 and 5 and to adapt SCSS array processing at subscriber stations (SS). The training preambles are distributed across all subchannels to aid robust reception at the subscriber station. The subscriber station can use advanced channel estimation techniques (i.e, diversity combining, code nulling) to optimally combined samples in subcarrier domain, antenna domain, or combined subcarrier and antenna domain, Data is transported in the burst regions as indicated in the FIG. 1. The frame structure provides numerous modulation and coding schemes (MCS), repetitions methods and permutation methods tailored for a wide variety of the RF propagation conditions. For example, the PUSC permutation of IEEE 802.16 is effective for frequency selective channels since it distributes subcarriers randomly throughout the channel. On the other hand, the AMC permutation is effective for varying the MCS level according the SINR of the adaptive modulation and coding (AMC) subchannel therefore optimized the data throughput in frequency selective channels.

When SCSS is used with the AMC permutation, adjacent AMC slots are separated by n/2 subchannels are used to transport data.

Thus, subchannels containing normal data traffic are sent with repetitions to aid robust reception via frequency diversity combining techniques or via SCSS code nulling. In this case, physical subchannel i and n/2+i are paired. These are remapped into logical subchannels j and j+1 during frame building. The number of repetitions is signaled in the FCH. Repetitions apply to the MCS levels signaled in the DL and UL maps.

The AAS frame structure described above represents novel advancements relative the conventional usage of IEEE 802.16-2004, IEEE 802.16-2005 and its amendments COR1 and COR2. In the conventional usage of an IEEE 802.16 system, the access channel is realized by using a small set of CDMA ranging codes sent over numerous payload slots thus robbing slots for data transport. There is no mechanism in the standard to achieve a multiplicative increase in the number of the access slots other that by brute force methods. Brute force methods increase the number of allocated access slots multiplicatively, and will result in a dramatic reduction in payload capacity. Slots used for access cannot be used for payload. In the framing structure constructs described herein, an M_base multiplicative increase in the number of access channels is available by using multi-user AAS methods. The efficiency of this mechanism is superior to the conventional mechanism by greater that M_base times.

Moreover, the access technique of the conventional implementation of IEEE 802.16 suffers from frequent collisions where subscriber randomly select the same CDMA code from a small codebook and use it for access at the same time. In this case, the subscribers must retry multiple times to gain network access after random backoff times. This of course, results in increased latency, random packet jitter, and poor efficiency. In the framing structure constructs described herein, collisions are avoided by enabling advanced signal separation methods even though the multiple subscribers require access at the same time.

The new AAS frame structure, as it relates to data payload transport, represents novel advancements relative to the IEEE 802.16-2004, IEEE 802.16-2005 and its recent amendments COR1 and COR2. In the conventional IEEE 802.16 implementation, simple repetitions of data slots are allowed, but only for QPSK rate ½ constellations and only for adjacent slots. This allows for repetition combining at the receiver to reduce the overall SNR requirement. Repetition combining is a suboptimal technique known in the literature since the early days of coding theory.

The novel approach described herein allows repetition of the data, such that the redundant slots are spaced at ½ BW where BW is the active bandwidth of the RF channel, The redundant slots and embedded pilot subcarriers may be multiplied by a complex scalar to further improve the performance of advanced processing methods. The ½ BW spacing has numerous benefits: 1) it enables advanced processing algorithms such as SCSS and SCSS adaptive arrays that cancel con-channel interference. 2) The ½ BW spacing maximizes the range-based nulling resolution of these algorithms and thus is able to separate closely spaced subscribers, 3) The ½ BW spacing is greater that the coherent bandwidth of the RF channel multipath thus improving the performance of diversity combination and 4) removes the restriction on the modulation level thus permitting any of the standards-base modulations to be used. This significantly increases link capacity and thus, overall base station capacity.

The new AAS frame structure, as it relates to downlink (DL) training preambles, represents novel advancements relative the conventional IEEE 802.16-2004, IEEE 802.16-2005 and its amendments COR1 and COR2. In the conventional IEEE 802.16 implementation, DL training preambles are absent for the purpose of training adaptive processing at the subscriber (SCSS or conventional adaptive arrays) or if present, are used to demarcate simple DLFP messages. In the new invention, special DL link preambles accomplish multiple purposes including: 1) Training of conventional adaptive array processing at the SS, 2) Training SCSS adaptive arrays at the SS, 3) uniquely detecting the active SS, 4) having the property of one AMC slot granularity for efficiency with small packet sizes and optimal performance in frequency selective channels, 5) and demarcating the AAS zone within a frame without further processing of the broadcast map. This latter capability is important for edge of cell SS that cannot read the broadcast map.

Finally, the advantages of the new inventions can be realized using the physical layer constructs of the existing standards with only minor modifications to layout rules and protocols and by removing unnecessary restrictions, as described herein.

Frame Detailed Description

Figure 2:
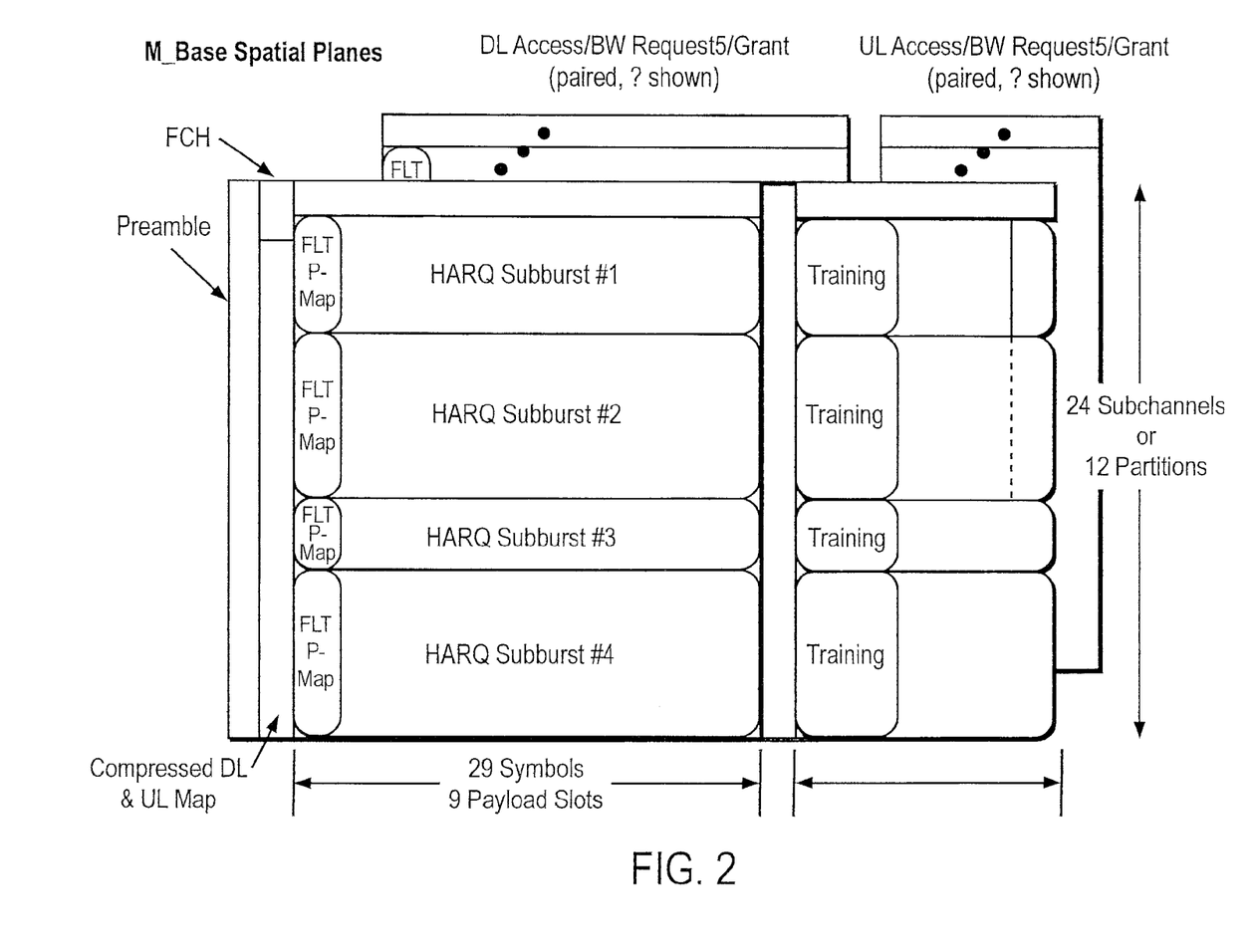
FIG. 2 illustrates the detailed frame structure for one-half of the RF (5 MHz in this case) channel.

FIG. 2 shows the detailed frame structure for one-half of the RF (5 MHz in this case) channel The stack carrier spread spectrum pairing has been eliminated for clarity in this figure. The DL and UL subframes are specified as 32 and 15 symbols respectively for this example but can range over a set of integers in a given implementation. The frame start preamble demarcates the beginning of the downlink subframe and is located in OFDMA symbol 1. The FCH and MAP follow the preamble and are located in OFDMA symbols 2 and 3 (the MAP may continue into subsequent symbols if necessary). The AAS_DS zone follows immediately thereafter for the remaining 29 symbols. In the downlink, 27 data symbols are allocated for data and the remaining 2 symbols are allocated for the forward link training (FLT) sequence and partition map (PMAP) as shown. The PMAP contains additional control information that is may be sent to the subscriber with the benefits of array gain and interference cancellation.

In the uplink, 15 symbol times are available in the UL subframe. Training sequences are present in symbols 1-8 or optionally in symbols 1-5. Data are located in symbols 9-14 or optionally in symbols 6-14. The Channel Quality Indicator Channel (CQICH) is sent at the end of the UL subframe in symbol 15. Once again, the CQICH is received with the benefits of beamforming and interference cancellation.

SCSS Spatial Planes

FIG. 2 shows how the frame structure in combination with SSCS enables simultaneous data transport on M-base spatial planes. In each plane, multiple users can share the time-frequency resources for data transport. Alternately, one user may be granted the all resources within one spatial plane.

Other users, distinctly separable onto different spatial planes using code nulling or generalized space/code nulling, receive and transmit data without interfering with other co-channel users. In this way, the capacity of the base station may be increased M-base relative to a single plane of processing. The access channel can be processed in the same way to increase the number of effective access channels by M-base. This efficiently scales the bandwidth request, bandwidth grant, ranging and registration mechanisms without depleting subchannels as is done conventionally.

OFDMA Subcarrier Organization

Figure 3:
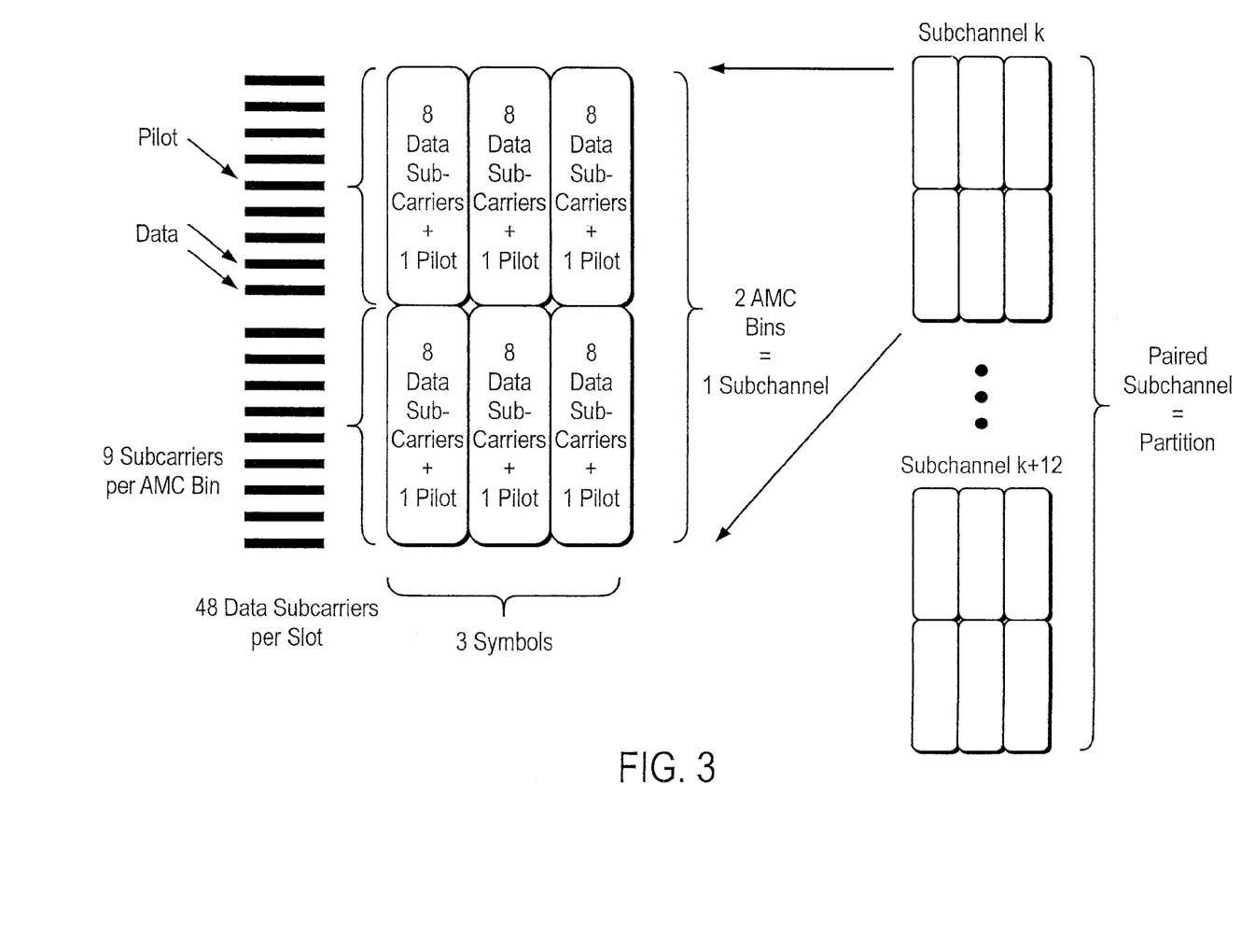
FIG. 3 illustrates partition construction detail.

OFDMA subcarriers within each OFMDA symbol are modulated using either a Quadrature phase-shift keying (QPSK), 16 Quadrature amplitude modulation (QAM) or 64 QAM constellations. The subcarriers are grouped together using the adjacent subcarrier permutation of the AMC subchannel shown in FIG. 3. Nine adjacent subcarriers are grouped together using the AMC bin structure. Six AMC bins are grouped together to form a slot. The slot consists of 48 data subcarriers and 6 pilot subcarriers and represents the lowest level of FEC block granularity. 48 (96) AMC bins span the 5(10) MHz subband. Slots are constructed using a tile structure of 3 OFDMA symbols by 2 AMC bins. A stripe in time of 2 AMC bins wide is called a subchannel. Thus, a total of 24 subchannels×9 slots are available for data transport in the DL and total of 24 subchannels×3 slots are available for data transport in the UL. Subchannel k & Subchannel k+N/2 are paired supporting stacked carrier spread spectrum as shown in FIG. 3. The pairing of two subchannels spread in the frequency domain is defined as a partition. Identical payload bits modulate the paired subchannels. The amplitude and phase of the subcarriers will be modified by the transmit weight using SCSS transmission spreading.

Hybrid ARQ

Figure 4:
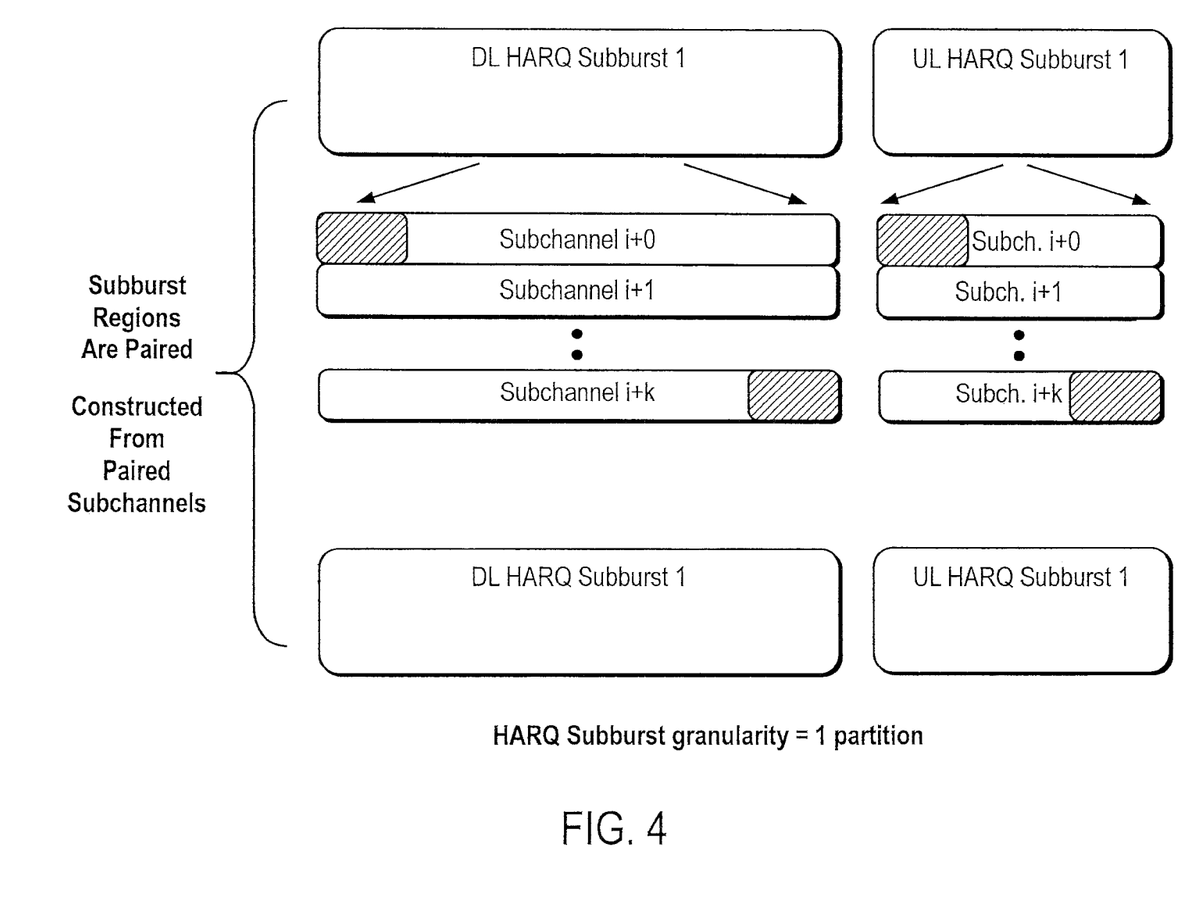
FIG. 4 illustrates the logical grouping of partitions into HARQ subbursts for the purposes of automatic repeat request (ARQ) retransmission.

FIG. 4 illustrates the logical grouping of partitions into HARQ subbursts for the purposes of automatic repeat request (ARQ) retransmission. Within each HARQ subburst, a CRC16 checksum is appended to the payload. If the CRC16 parity test fails, the base station has the option of retransmitting the subburst or requesting retransmission of the subburst from the SS. Hybrid ARQ effectively combines FEC decoding and CRC checksums at the physical layer to rapidly signal, through physical layer feedback, the success or failure of the transmission and to optionally request retransmission.

Aspects of the invention, related to the above description on framing, are as follows.

A method of grouping OFDMA symbols and subgroups of OFDMA subcarriers/subchannels therein to support stacked carrier spread spectrum and SCSS adaptive array processing. The grouping and sub-grouping of OFDMA symbols and subchannels is referred to as the AAS Directed Signaling (DS) frame.

A method of constructing AAS DS frames with high capacity access channels supporting bandwidth request/grant, ranging and registration.

A method of constructing AAS DS frames to support high capacity data channels enabling range extension, capacity enhancement or simultaneous range and capacity enhancement.

A method of constructing AAS DS frames to support the generation of a multiplicity of logical access channels. The construction enables the use of stacked carrier spread spectrum in combination with code nulling and array processing to generate the multiplicity of access channels.

A method of constructing AAS DS frames to support the generation of a multiplicity of spatial planes to transport data. The construction enables the use of stacked carrier spread spectrum in combination with code nulling and array processing to generate the multiplicity of spatial planes.

A method of extending the range of broadcast control messages by modulating the data over thin frequency tiles and long time tiles instead of broadcasting messages over wide frequency tiles as conventionally. The former method allows selective power concentration on the access channels by the subscriber station to improve link budget with a modest increase in SS power. Moreover, data in the access channels can be sent at a higher MCS level at a longer range benefiting from beamforming and interference cancellations algorithms.

A method of transferring bidirectional uni-cast control data using beamforming and interference cancellation algorithms such as SCSS to control the MCS level, partition opening and closing commands, and retransmission requests.

A method of transferring bidirectional uni-cast control data using beamforming and interference cancellation algorithms such SCSS to register and authenticate users located beyond the range of standard broadcast messages.

Range and Capacity

The range and reliability of the payload and control channels is significantly enhanced using the AAS framing structure above in combining with beamforming and interference cancellation algorithms such as SCSS.

To test the effectiveness of this approach, a simulation of 19 base stations and 190 SS nodes was performed using the SUI-3 channel model used by IEEE 802.16. The model was extended to include realistic angle spread and multipath delay using the ray-tracing geometrical elliptical model (GEM). This ensures that each multipath has a unique spatial signature, time delay, and complex reflection coefficient. The model is calibrated to produce the same K-factor and rms delay spread as indicated by the corresponding parameters in the SUI models. The GEM creates Doppler by moving the reflectors, by moving the SS nodes or by moving both each symbol period.

Since each multipath has a unique spatial signature and time delay, the effects of frequency dispersion (related to the coherence bandwidth and delay spread) and time dispersion (related to relative motion and Doppler) are accurately modeled.

Figure 5:
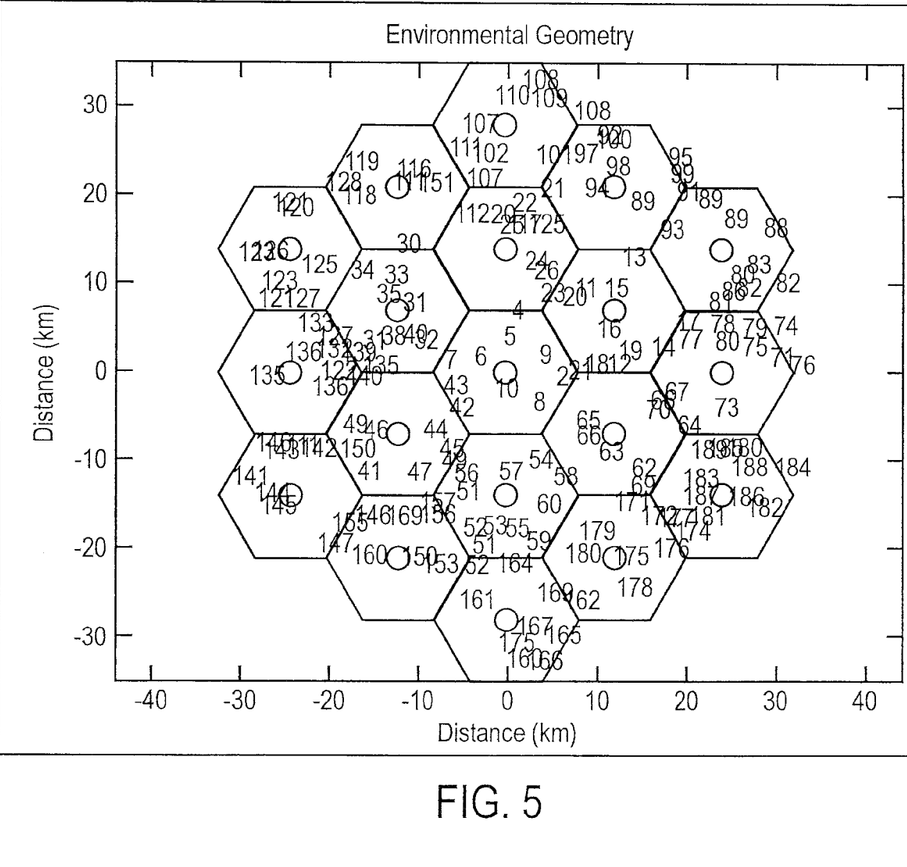
FIG. 5 illustrates a location plot of subscriber stations from a typical Monte Carlo run.

Each base station in the simulation uses 16 antennas where 4 antennas are distributed in 4 sectors aligned to the rectangular street grid of an urban core. Each base station connects to 10 co-channel full-bandwidth subscriber stations simultaneously in this simulation. The cell-to-cell reuse factor corresponds to K=1. The simulation uses thin 1×6 AMC subchannels with 64 preamble training subcarriers. The location of each SS node is randomly selected from a uniform distribution on each Monte Carlo trial. A location plot of subscriber stations from a typical Monte Carlo run is shown in FIG. 5 for reference.

Figure 6:
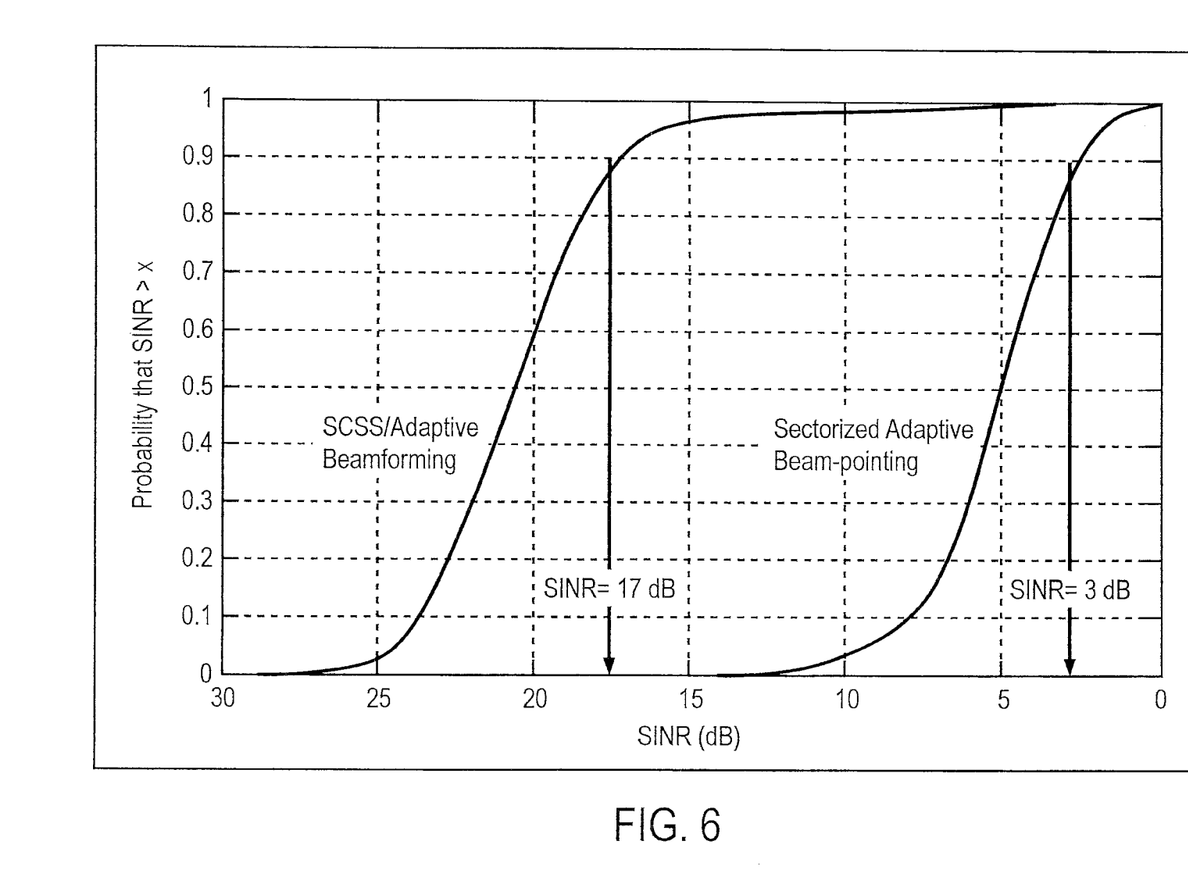
FIG. 6 shows the cumulative distribution of the output SINR on the uplink for the simulation parameters given above.

FIG. 6 shows the cumulative distribution of the output SINR on the uplink for the simulation parameters given above. Two algorithms were tested with the two different frame structures; the first using SCSS with an array of 16 antennas and the frame structure above, and the second using sectorized beamforming with 16 antennas and the frame structure described in IEEE 802.16-2004. Note that the multi-user SCSS SINR is 20 dB at the $50^{th}$ percentile. For reference, a second curve is plotted for the same antenna array titled "sectored antennas". In this case the simulation employed sectored antennas at the base station that are pointed at each desired user. The beamforming was based on estimates of the antenna steering vector with power control but without directing nulls at interference. Thus, the antennas are electronically combined using modern MMSE beamforming, to achieve the best SINR.

FIG. 6 shows the quantitative difference between the two approaches and the benefits of the new frame structure and multi-user SCSS in a fully cellularized deployment where the frequency reuse factor is 1/10. The SCSS/Adaptive Beamforming system achieves an SINR of 17 dB for 90% of the SS link. This SINR supports the CTC 64QAM rate ¾ modulation providing 4.5 information bits per subcarrier. On the other hand, the Sectored Antenna approach with MMSE beamforming achieves 3 dB for 90% of the SS links. This supports the CTC QPSK rate ½ modulation providing only 1 information bit per subcarrier. Clearly, the combination of the AAS framing structure with the SCSS algorithm increases link capacity, base station capacity and cell radius relative to conventional implementations.

Finally, the link reliability of the new approach is superior to the conventional IEEE 802.16 implementation. This is due to doubling of the number of signal copies transmitted between the base station and the subscriber station. The independent fading characteristics of each copy are assured since the framing structure maximizes the frequency separation between copies. For most RF channels this separation is greater than the coherence bandwidth of the channel, hence statistically independent fading is guaranteed. Thus, the framing structure in combination with SCSS (or similar algorithms) doubles the order of the diversity combiner during despreading operations and can make a 8 to 15 dB improvement in fade margin in a Rayleigh compared to the conventional IEEE 802.16 implementation.

Aspects of the invention, related to the above description on range and capacity, are as follows.

A new frame structure supporting beamforming and interference cancellation such as SCSS to achieve higher link budget gain and or link capacity.

A new frame structure supporting beamforming and interference cancellation such as SCSS to achieve reduce link margin and/or increase link reliability.

Uplink Training Preambles and Fast Bandwidth Request

FIG. 2 illustrates a region within the uplink subframe reserved for training sequences. The sequences are used for adapting the SCSS array with low misadjustment error. The number of training subcarriers and the arrangement of the subcarrier training tile must be matched to the time-frequency support of the RF channel. If the training is spread over too many subcarriers in the frequency domain, then the dispersive characteristics of the channel due to multipath will cause a rapid rise in the interference floor. In the same fashion, if training is spread over too many subcarriers in the time domain, then the time selectivity (mobility) of the channel due to multipath will cause a rapid rise in the interference floor. Accordingly, this embodiment utilizes training sequences that have a "tile" layout that are a fraction of the coherence bandwidth and or fraction of the time support of the RF channel.

Figure 7:
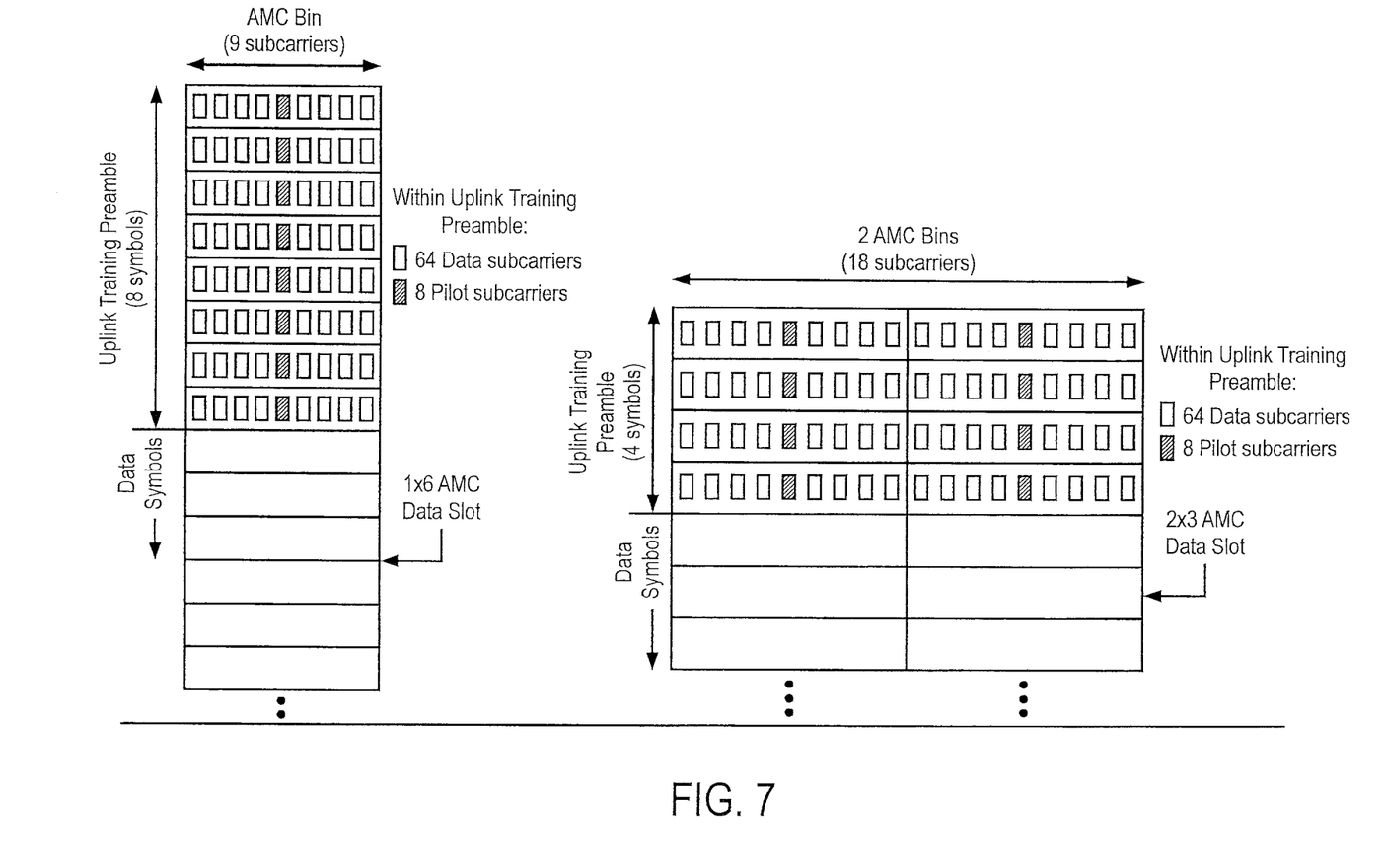
FIG. 7 shows two tile layouts suitable for the IEEE 802.16 AMC permutation.

FIG. 7 shows "two tile layouts" suitable for the IEEE 802.16 AMC permutation. In this embodiment, enough training subcarriers (64) are available for 16 element antenna arrays using SCSS. Since the training tile conforms to the AMC slot definition, each AMC slot can train the base station independently. This leads to considerable flexibility in assigning different users to AMC slots or to assigning a single user to multiple AMC slots. In the latter case, the performance due to frequency dispersion is not compromised.

Note that multiple co-channel users must use the same training region and training tile size. In this way, the base station can optimally estimate the interference in the network to optimize the link performance.

Definition of Uplink Preambles (Codewords)

Codeword Properties

The uplink training preambles are based upon 64 QPSK subcarriers constructed from Hadamard sequences. The properties of these preambles are as follows:

Provides a spatial training sequence for up to 16 antennas with the adequate time bandwidth product Provides unique SS identification at the base station. The preambles can be detected in co-channel interference with beamforming gain Provides an initial and periodic ranging capability for edge-of-cell SS Provides multi-user AAS bandwidth request capability with appropriate messaging.

8064 codewords are available

High probability of detection, low false alarm rate consistent with modest cross-correlation properties between assigned codewords at various code delays The same codewords may be re-used multiple times at the base station if sectors or sub-bands are used Robust codeword reuse factor of 4 between base stations.

The base station can separate multiple SS in the AAS using different codewords

Codeword Construction

Each SS registered to a base is assigned a basic CID and a unique Hadamard access codeword (ACW) for bandwidth requests and for training. The base station pairs the access code with the basic CID. The access code set is assigned to the base station during cell planning as follows. Within a given sub-band or sector, each SS has its own unique access and traffic code. There are a maximum of 8064 access codewords. The access codewords, a=2016t+c, are divided into four equal sets; $0 \le t \le 3$, where t is the MR-BS reuse "color". Each set of 2016 codewords are divided into two types with each type allocated a certain number of access codes: up to 2000 are assigned to the SS nodes for bandwidth request, periodic ranging and traffic: $0 \le c \le 1999$, and there are 16 access codewords, c, for SS initial ranging: $2000 \le c \le 2015$.

ACW codewords are based on Hadamard basis functions. ACW are described by an access code, a, $0 \le a \le 8064$. A ACW codeword, $p_a$ modulating the 64 QPSK subcarriers has in-phase and quadrature components taken from the columns h of a 64 by 64 Hadamard matrix, $$b = \text{mod}(a, 4032)$$

$$i_1 = \text{mod}(b, 64)$$

$$i_0 = \text{mod}(\lfloor b/64 \rfloor + i_1 + 1, 64)$$

$$p_a = F_1 h_{i_1} + j F_1 h_{i_0}, \text{ if } 0 \le a \le 4031$$

$$p_a = F_2 h_{i_1} + j F_2 h_{i_0}, \text{ if } 4032 \le a \le 8063$$

$F_1$ is a 64×64 toggle matrix derived from the identity matrix with the following diagonal values (zero-based indices) toggled to −1; 4, 8, 9, 14, 15, 20, 24, 25, 29, 30, 35, 41, 46, 47, 50, 52, 56, 62.

$F_2$ is a 64×64 toggle matrix derived from the identity matrix with the following diagonal values (zero-based indices) toggled to −1: 1, 2, 5, 6, 18, 21, 23, 26, 28, 32, 34, 38, 43, 48, 49, 54, 60.

The toggle matrices increase the number of ACW codewords by a factor of two and lowers the cross-correlation of codewords between adjacent base station. A base station removes the effect of the toggle matrix before further processing.

The first 2-bit symbol of the Hadamard sequence modulates the first subcarrier in the first bin of the subchannel definition. Mapping proceeds in ascending order with all pilot subcarriers in the AMC subchannel skipped.

Aspects of the invention, related to the above description on uplink training preambles and fast bandwidth request, are as follows.

A method of training a SCSS adaptive array or conventional adaptive array with low misadjustment error using a combination of known preambles and unknown low MCS data. This method allows successful processing on higher MCS data.

A framing structure and method of training an SCSS adaptive array or conventional adaptive array with low misadjustment error using known preambles where the framing layout and training tiles are matched to time-frequency support of RF channel thus ensuring low misadjustment error of the linear combiner in frequency selective and time selective channels.

A framing structure and method of training an SCSS adaptive array or conventional adaptive array with low misadjustment error using known preambles where the framing layout ensures that all co-channel users the same training region and same training tiles in order to optimize network performance for all co-channel users.

A framing structure and method of training an SCSS adaptive array or conventional adaptive array with low mis-adjustment error using known preambles where the framing layout ensures that different users can uniquely train the base station with the granularity of one data slot.

A method of creating subsets of Hadamard codewords distributed among base stations within a cluster of P base stations and reused every cluster to achieve better inter-cell interference management A method of generating efficient bandwidth requests to a base station prior to higher bandwidth data transport in a co-channel environment.

A method of detecting and identifying the user in co-channel interference for the purposes of bandwidth request, periodic ranging and handover ranging using the set of Hadamard codewords.

Aspects of the invention, related to combinations of the above descriptions on framing, range and capacity, and uplink training preambles and fast bandwidth request, are as follows. A method of grouping OFDMA symbols and sub-groups of OFDMA subcarriers/subchannels therein to support stacked carrier spread spectrum and SCSS adaptive array processing. The grouping and sub-grouping of OFDMA symbols and subchannels is referred to as the AAS Directed Signaling (DS) frame.

A method of constructing AAS DS frames with high capacity access channels supporting bandwidth request/grant, ranging and registration.

A method of constructing AAS DS frames to support high capacity data channels enabling range extension, capacity enhancement or simultaneous range and capacity enhancement.

A method of constructing AAS DS frames to support the efficient generation of a multiplicity access channels. The construction enables the use of stacked carrier spread spectrum in combination with code nulling and array processing to generate the multiplicity of access channels.

A method of constructing AAS DS frames to support the generation of a multiplicity of spatial planes to transport data. The construction enables the use of stacked carrier spread spectrum in combination with code nulling and array processing to generate the multiplicity of spatial planes.

A method of extending the range of broadcast control messages by modulating the data over thin frequency tiles and long time tiles instead of broadcasting messages over wide frequency tiles. The former method allows selective power concentration on the access channels by the subscriber station to improve link budget with a modest increase in SS power. Moreover, data in the access channels can be sent at a higher MCS level at a longer range benefiting from beamforming and interference cancellations algorithm A method of transferring bidirectional uni-cast control data using beamforming and interference cancellation algorithms such as SCSS to control the MCS level, partition opening and closing commands, and retransmission requests.

A method of transferring bidirectional uni-cast control data using beamforming and interference cancellation algorithms such SCSS to register and authenticate users located beyond the range of standard broadcast messages.

A new frame structure supporting beamforming and interference cancellation such as SCSS to achieve higher link budget gain and or link capacity.

A new frame structure supporting beamforming and interference cancellation such as SCSS to achieve reduce link margin and/or increase link reliability.

A method of training a SCSS adaptive array or conventional adaptive array with low misadjustment error using a combination of known preambles and unknown low MCS data. This method allows successful processing on higher MCS data.

A framing structure and method of training an SCSS adaptive array or conventional adaptive array with low misadjustment error using known preambles where the framing layout and training tiles are matched to time-frequency support of RF channel thus ensuring low misadjustment error of the linear combiner in frequency selective and time selective channels.

A framing structure and method of training an SCSS adaptive array or conventional adaptive array with low misadjustment error using known preambles where the framing layout ensures that all co-channel users the same training region and same training tiles in order to optimize network performance for all co-channel users.

A framing structure and method of training an SCSS adaptive array or conventional adaptive array with low misadjustment error using known preambles where the framing layout ensures that different users can uniquely train the base station with the granularity of one data slot.

A method of creating subsets of Hadamard codewords distributed among base stations within a cluster of P base stations and reused every cluster to achieve better inter-cell interference management A method of generating efficient bandwidth requests to a base station prior to higher bandwidth data transport in a co-channel environment.

A method of detecting and identifying the user in co-channel interference for the purposes of bandwidth request, periodic ranging and handover ranging using the set of Hadamard codewords.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. An adaptive antenna system (AAS) comprising:
   a plurality of antennae for communicating between a base station and a subscriber station, in which the AAS employs a direct signaling structure operative with a downlink subframe and an uplink subframe, the downlink subframe being generated by the base station and the uplink subframe being generated by the subscriber station;
   the downlink subframe comprising:
      a plurality of downlink access subchannels, wherein each downlink access subchannel is paired with a non-adjacent downlink access subchannel;
      a predefined number of orthogonal frequency-division multiple access (OFDMA) symbols containing AAS training preambles that are distributed across all the downlink access subchannels that demarcate an AAS downlink zone and are configured to adapt to stacked carrier spread spectrum adaptive array processing at the subscriber station; and
      a plurality of downlink payload subchannels, wherein each downlink payload subchannel is paired with a non-adjacent downlink payload subchannel and each downlink payload subchannel contains at least one downlink data burst region;
   the uplink subframe comprising:
      a plurality of uplink access subchannels, wherein each uplink access subchannel is paired with a non-adjacent uplink access subchannel;
      a predefined number of OFDMA symbols containing AAS training preambles that are distributed across all the uplink access subchannels that demarcate an AAS uplink zone and are configured to adapt to stacked carrier spread spectrum adaptive array processing at the base station; and
      a plurality of uplink payload subchannels, wherein each uplink payload subchannel is paired with a non-adjacent uplink payload subchannel and contains at least one uplink data burst region.

2. The system of claim 1, wherein the stacked carrier spread spectrum adaptive array processing provides beamforming and interference cancellation and obtains improved link budget gain for the system.

3. The system of claim 1, wherein the stacked carrier spread spectrum adaptive array processing provides beamforming and interference cancellation to improve link capacity of the system.

4. The system of claim 1, wherein the subscriber station uses diversity combining channel estimation.

5. The system of claim 1, wherein the subscriber station uses code nulling channel estimation.

6. The system of claim 1, wherein an OFDMA subcarrier is associated with each OFMDA symbol.

7. The system of claim 6, wherein the OFDMA subcarrier is modulated using one of a Quadrature phase-shift keying (QPSK) and a Quadrature amplitude modulation (QAM) constellation.

8. The system of claim 7, wherein OFDMA subcarriers are grouped in an AMC subchannel.

9. The system of claim 8, wherein each uplink access subchannel and each downlink access subchannel includes two AMC bins and wherein nine adjacent subcarriers are grouped in an AMC bin.

10. The system of claim 9, wherein six AMC bins are grouped together to form a slot comprising 48 data subcarriers and 6 pilot subcarriers.

11. he system of claim 9, wherein each of a plurality of slots is constructed using a tile structure, each tile having three OFDMA symbols by two AMC bins.

12. The system of claim 9, further comprising a plurality of training tiles.

13. The system of claim 12, wherein the layout of the downlink and uplink subframes and the training tiles are matched to time-frequency support of an RF channel to obtain low misadjustment error of a linear combiner in frequency selective and time selective channels.

14. The system of claim 12, wherein same regions of the training preambles and same training tiles are used to optimize network performance for all co-channel users.

15. The system of claim 12, wherein the base station is uniquely trained by different users with the granularity of one data slot.

16. The system of claim 1, wherein each access subchannel of the downlink subframe comprises one or two adaptive modulation and coding (AMC) bin of OFDM symbols.

17. The system of claim 1, wherein each access subchannel of the uplink subframe comprises one subchannel of OFDM symbols.

18. The system of claim 1, wherein the downlink subframe includes high capacity access channels.

19. The system of claim 18, wherein the high capacity data channels extend range and enhance capacity of the adaptive antenna system.

20. The system of claim 16, wherein the downlink subframe includes a plurality of access channels that use stacked carrier spread spectrum, code nulling and array processing.

* * * * *